United States Patent [19]

Kawamura et al.

[11] Patent Number: 4,658,397
[45] Date of Patent: Apr. 14, 1987

[54] TIME DIVISION MULTIPLEX DATA TRANSFER SYSTEM AND METHOD FOR TELEPHONE SWITCHING OR LIKE APPLICATIONS

[75] Inventors: Masataka Kawamura; Masaharu Kamigaki, both of Tokyo, Japan

[73] Assignee: Iwatsu Electric Co., Ltd., Tokyo, Japan

[21] Appl. No.: 792,365

[22] Filed: Oct. 29, 1985

[30] Foreign Application Priority Data

Oct. 31, 1984 [JP] Japan .................. 59-229599

[51] Int. Cl.⁴ ............................. H04Q 11/04
[52] U.S. Cl. ........................... 370/58; 370/63
[58] Field of Search ............ 370/58, 63, 64, 61, 370/59

[56] References Cited

U.S. PATENT DOCUMENTS

| | | | |
|---|---|---|---|
| 4,276,637 | 6/1981 | LeDieu | 370/58 |
| 4,365,330 | 12/1982 | Chopping et al. | 370/58 |
| 4,455,648 | 6/1984 | Biaz et al. | 370/58 |
| 4,500,986 | 2/1985 | Carver | 370/58 |

FOREIGN PATENT DOCUMENTS 54-103608 8/1979 Japan .
54-103609 8/1979 Japan .

Primary Examiner—Douglas W. Olms
Assistant Examiner—Kenneth I. Rokoff
Attorney, Agent, or Firm—Woodcock Washburn Kurtz Mackiewicz & Norris

[57] ABSTRACT

A telephone or like telecommunications network is disclosed which has n input highways and m output highways, where n is not less than m, each for the time division multiplex transmission of k channels of data. For selective data transfer between any selected channel of any selected input highway and any selected channel of any selected output highway, a digital, time division switching system is provided which comprises n data memories corresponding respectively to the n input highways, each data memory having k addresses corresponding respectively to the k channels of the corresponding input highway. A control circuit having a control memory causes the data from the input highways to be written sequentially into the data memories and for reading the data memories n times during a preassigned transmission period of each channel on the input and output highways. The data that have been read out from the data memories are gated to pass only the data that have been recovered from that address which corresponds to the selected channel, of that data memory which corresponds to the selected input highway, to the desired channel of the desired output highway.

6 Claims, 6 Drawing Figures

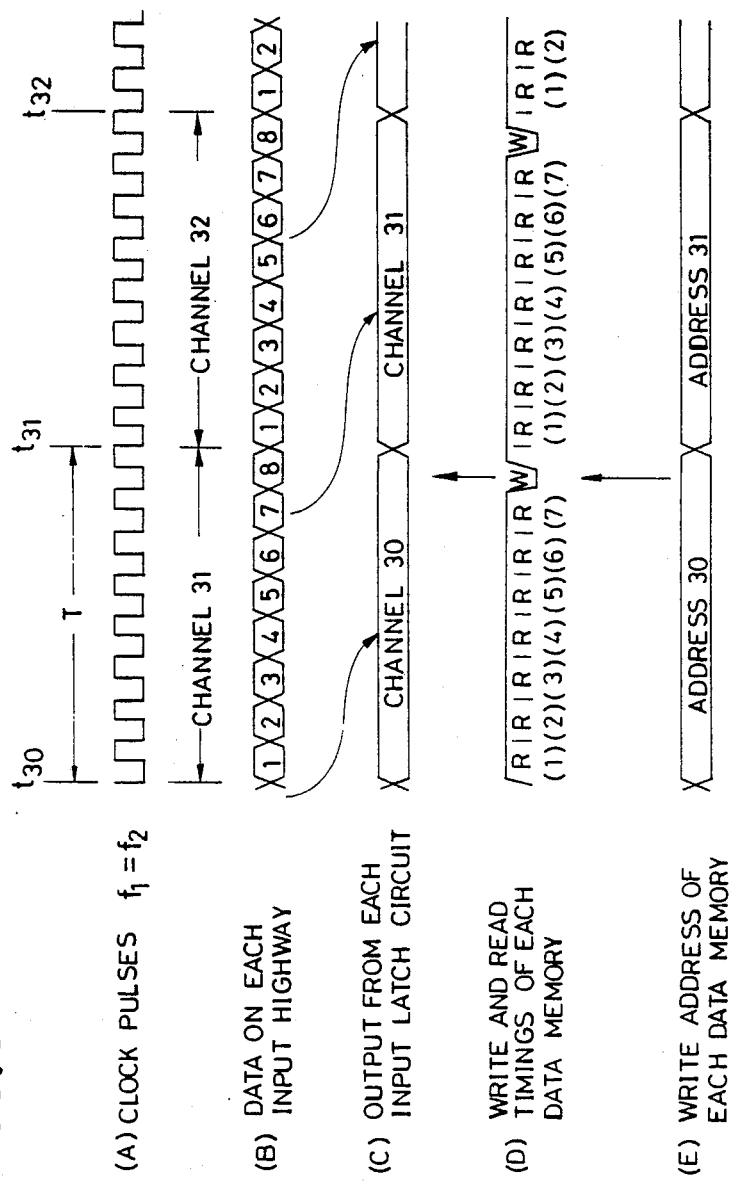

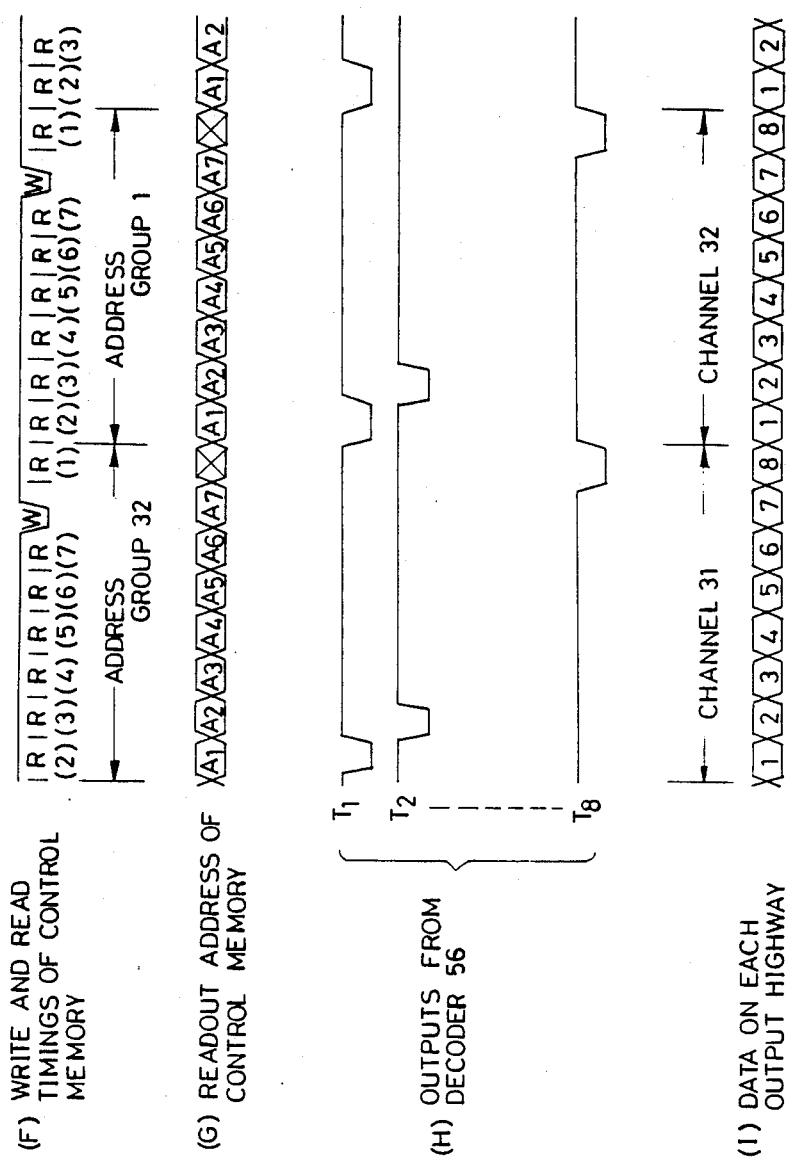

TIME DIVISION MULTIPLEX DATA TRANSFER SYSTEM AND METHOD FOR TELEPHONE SWITCHING OR LIKE APPLICATIONS

BACKGROUND OF THE INVENTION

Our invention relates generally to telecommunications networks by time division multiplexing, such as those for telephone, facsimile, and other data transmission, and particularly to a time division multiplex telecommunications network having a plurality of input highways each for the time division transmission of two or more channels of data, and a plurality of output highways each for the time division transmission of two or more channels of data. Still more specifically, our invention pertains to means for, and a method of, transferring data in such telecommunications network from any selected channel of any input highway to any selected channel of any output highway.

Time division switching is known whereby a plurality or multiplicity of signals are sent over a common path by using sucessive time intervals for the different signals. We are also aware that time division techniques have been used for channel separation in a telecommunications network having a plurality of input highways and a plurality of output highways. Japanese Laid Open Patent Applications Nos. 54-103608 and 54-103609 both suggest switching systems between such input and output highways, each highway being for the time division transmission of two or more channels.

We object to these and similar prior art time division switching systems because each input highway is provided with as many data memories as there are output highways. The total number of the data memories becomes prohibitive in large telecommunications networks comprised of many input highways and many output highways. Such a large number of data memories have rendered the conventional time division switching systems unnecessarily bulky and expensive.

SUMMARY OF THE INVENTION

We have hereby succeeded in drastically reducing the number of data memories required for selective data transfer between a plurality of time divided input highways and a plurality of time divided output highways.

Stated broadly, our invention concerns a telecommunications network having n input highways, where n is an integer of not less than two, each for the time division multiplex transmission of k channels of data, where k is an integer of not less than two, and m output highways, where m is an integer equal to or less than n, each for the time division multiplex transmission of k channels of data. For the transfer of data from any selected channel of any selected input highway to any desired channel of any desired output highway, there are provided memory means comprising n data memories corresponding respectively to the n input highways. Each data memory has k addresses, or storage locations, corresponding respectively to the k channels of the corresponding one of the input highways. All the data memories are adapted to sequentially store at their addresses the corresponding channels of data from the corresponding input highways. Further, all the data memories are addressed in common for reading out the stored data from each data memory n times during each preassigned time interval (T) for the transmission of one channel of data on the input and output highways. Also included are selective data transfer means for transferring to the desired channel of the desired output highway the data that have been read out from that one of the addresses which corresponds to the selected input channel, of that one of the data memories which corresponds to the selected input highway.

Employed for controlling the writing and reading of data into and from the data memories as above is a control circuit including means for providing a first transfer control signal indicative of the selected input highway, a second transfer control signal indicative of the selected channel of the selected input highway, a third transfer control signal indicative of the desired output highway, and a fourth transfer control signal indicative of the desired channel of the desired output highway. The control circuit uses these transfer control signals for reading out the stored data from that data memory address which corresponds to the selected input channel of the selected input highway, and for causing the selective data transfer means to deliver the recovered data to the desired channel of the desired output highway.

The control circuit includes a control memory for addressing the data memories in reading out the data therefrom and for controlling n gate circuits, included in the selective data transfer means, so as to cause selective passage therethrough of the data read out from the corresponding data memories. The control memory has k address groups corresponding respectively to the channels on each input highway and output highway, each address group comprising n addresses corresponding respectively to the input highways.

As has been stated, the k channels of data from the n input highway are, after having been written into the respective data memories, read out n times during each channel transmission period T. The data thus read out include, of course, those to be transferrd to the desired channel of the desired output highway. If the n data signals obtained by reading the data memories n times as above are made to correspond to those demanded by the m output highways, then the result is essentially equivalent to the transmission of m channels (or n channels if m=n) of data during each channel transmission period T, with the n input highways connected to the m output highways. Therefore, during the complete transmission period (T×k) of all the k channels, the transmission of (k×m) channels, or of (k×n) channels if m=n, of data is possible. This highly effective use of the data memories explains why out invention requires only the same number of data memories as that of the input highways, as compared with the prior art wherein each input highway required the same number of data memories as that of the output highways.

According to a further feature of our invention, the noted n gate circuits have their inputs coupled to the respective data memories and their outputs interconnected. The interconnected outputs of the gate circuits are further coupled to m latch circuits which in turn are coupled to the m output highways respectively. The output from each gate circuit may therefore be delivered to either of the latch circuits as dictated by the control circuit. Data transfer must be possible between the n input highways and the m output highways during each channel transmission period T. Accordingly, both gate circuits and latch circuits are activated n times during each channel transmission period T. The control memory is used not only for reading the data memories n times during each channel transmission period T but also for activating the gate circuits the same number of times during the same period. As the required data are read out from any address of any data memory, the corresponding gate circuit is rendered conductive for the passage of the data therethrough. The latch circuits operate in synchronism with the channel transmissions over the input and output highways, each latching only the data that must be transferred on to the associated output highway.

It will also be appreciated that, having k groups of n addresses, the control memory is capable of specifying any address of any data memory for readout. Although the control memory and the set of data memories have only (k×n) addresses, the reading of the data memories n times during each period T in accordance with our invention makes possible the transfer of data from any of the k channels of any of the n input highways to any of the k channels of any of the m output highways.

The above and other features and advantages of our invention and the manner of realizing them will become more apparent, and the invention itself will best be understood, from a study of the following description and appended claims, with reference had to the attached drawings showing a preferred embodiment of our invention.

BRIEF DESCRIPTION OF THE DRAWINGS

FIG. 6 is also a chart explanatory of the operation of the various parts of the switching system of FIGS. 2 and 3.

DESCRIPTION OF THE PREFERRED EMBODIMENT

Figure 1:
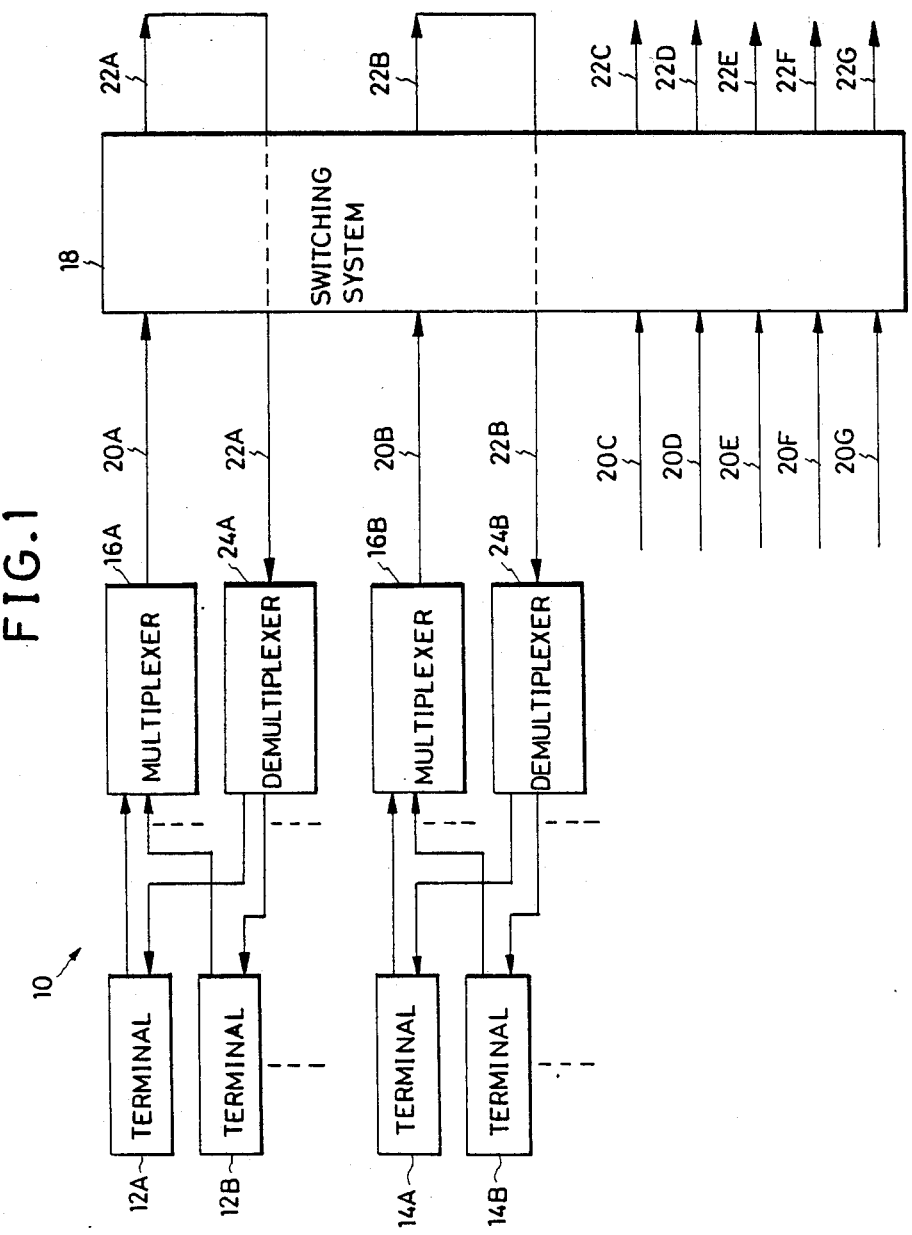
FIG. 1 is a block diagram of a time division muliplex telephone network including a digital switching system incorporating the novel concepts of our invention.

We will now describe our invention in detail as applied to a digital telecommunications network illustrated diagrammatically in FIG. 1. Generally designated 10, the exemplified telecommunications network is shown to have a plurality or multiplicity of terminal units 12A, 12B . . . , 14A, 14B . . . , etc. , such as telephone sets or facsimile transmitter/receivers. The first group of the two terminals 12A and 12B and additional 30 similar terminals, not shown, are connected to a first multiplexer 16A. Likewise, the second group of the two terminals 14A and 14B and additional 30 similar terminals, also not shown, are connected to a second multiplexer 16B. The first multiplexer 16A, for example, combines the outputs from the total of 32 terminals 12A, 12B . . . for time division multiplexing and serially sends out the 32 (k) channels of data over a common path in a well known manner. We assume that, although not shown for the simplicity of illustration, five other multiplexers are included in this telecommunications network, with each additional multiplexer similarly connected to 32 additional terminals.

The terminals 12A . . . , 14A . . . , etc. , may, or may not, be equipped to put out digital signals. If they are not, the multiplexers 16A, 16B . . . should incorporate analog to digital converters for digital time division multiplexing. In cases where the outputs from the terminals are digital, on the other hand, then the multiplexers may have only means for sampling the digital input signals.

The seven multiplexers 16A, 16B . . . are all connected to a time division switching system 18 via respective input highways 20A, 20B, 20C, 20D, 20E, 20F and 20G. Forming the gist of our invention, the time division switching system 18 functions for selectively channeling the data from the seven (n) input highways 20A through 20G to seven (m) output highways 22A, 22B, 22C, 22D, 22E, 22F and 22G. Like the input highways, these output highways are each constructed to serially convey 32 (k) channels of data signals by time division multiplexing.

FIG. 1 further indicates that the first two output highways 22A and 22B are connected to respective demultiplexers or separators 24A and 24B, respectively. The other five output highways 22C through 22G are likewise connected to respective demultiplexers, not shown, of the same configuration as the demultiplexers 24A and 24B. Each of these demultiplexers 24A, 24B . . . separates the incoming 32 channels of data signals from one another for delivery to the corresponding group of terminals 12A . . . , 14A . . . , etc. The digital data signals that enter the demulplexers may be decoded into analog signals either before delivery to the terminals or at these terminals. However, no decoding will be required of the terminals are constructed to respond directly to the digital signals.

Let us consider a conversation between the terminals 12A and 14A in this telecommunications network 10. A message from the terminal 12A will be sent via the first multiplexer 16A and first input highway 20A to the time division switching system 18, which will then connect the first input highway to the second output highway 22B. Connected to this second output highway, the second demultiplexer 24B will direct the incoming message signal to the desired terminal 14A. A message from the terminal 14A, on the other hand, will be sent to the terminal 12A via the circuit comprising the second multiplexer 16B, second input highway 20B, switching system 18, first output highway 22A, and first demultiplexer 24A.

Figure 2:
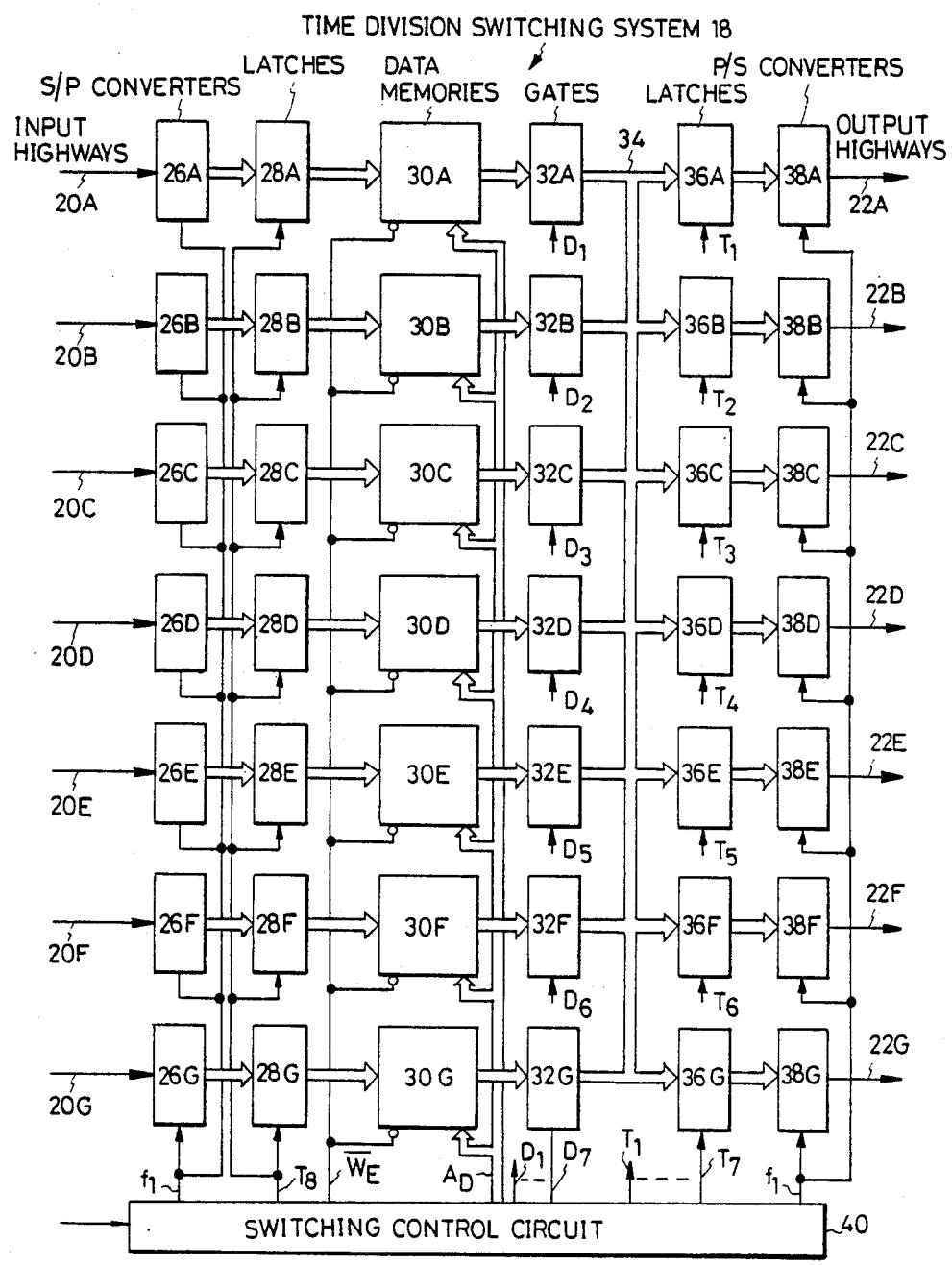
FIG. 2 is a block diagram of the telephone switching system of FIG. 1.

We have illustrated in FIG. 2 the detailed configuration of the time division switching system 18 of the telecommunications network 10. It will be observed, first of all, that the aforesaid seven input highways 20A through 20G are connected to serial to parallel converters 26A, 26B, 26C, 26D, 26E, 26F and 26G, respectively. These converters function to convert, channel by channel, the respective input serial data signals into parallel form. We assume that the digital information handled by this network 10 is of eight bit format. The 32 channels of data signals from each group of terminals are multiplexed on an eight bit basis, and the signals of Channel 1 through Channel 32 constitute one frame (see FIG. 5). Accordingly, from the serial to parallel converters 26A through 16G, the data signals of Channel 1 through Channel 32 are put out in parallel format under the control of a predetermined clock frequency, as will be later described in more detail.

The serial to parallel converters 26A through 26G have their outputs coupled to latch circuits 28A, 28B, 28C, 28D, 28E, 28F and 28G, respectively. These latch circuits latch the outputs from the respective serial to parallel converters on a channel by channel basis.

The latch circuits 28A through 28G have their outputs coupled to data memories 30A, 30B, 30C, 30D, 30E, 30F and 30G, respectively. Each of these data memories 30A through 30G has addressed storage locations corresponding to Channel 1 through Channel 32. Each data memory may be a usual semiconductor memory, incapable of simultaneous writing and reading. The 32 channels of data signals are sequentially written into each of the data memories 30A through 30G. The period of time assigned for writing the data signals into the data memories 30A through 30G are defined as T/(n+1), wherein T is the transmission time for each channel of data signal during one frame over the input and output highways (see FIG. 5). Since the number n of input highways is seven in this particular embodiment, the period of T/8 is assigned for writing, and the remainer T/8×7 for reading. The data signals that have been stored in the data memories 30A through 30G are read out seven times, the number being equal to the number of input, as well as output, highways, during each period T from the data memories 30A through 30G. Address specification for such readouts is random.

Connected to the outputs of the data memories 30A through 30G are gate circuits 32A, 32B, 32C, 32D, 32E, 32F and 32G, respectively, which selectively allow the passage therethrough of the parallel data signals from the associated data memories. The addresses of the various storage locations in the data memories 30A through 30G are specified in common for readout, so that the seven data signals recovered therefrom during each period T include those which are undesired at that time. Such undesired signals are blocked by the gate circuits 32A through 32G.

The gate circuits 32A through 32G have their outputs interconnected at 34 and connected to latch circuits 36A, 36B, 36C, 36D, 36E, 36F and 36G corresponding respectively to the seven output highways 22A through 22G. We will hereinafter refer to the latch circuits 36A through 36G as the output latch circuits in contradistinction to the first mentioned latch circuits 28A through 28G, to which we will refer, then, as the input latch circuits. The latching operations of the output latch circuits 36A through 36G are sequential, and they put out the input data signals demanded by the respective output highways 22A through 22G. The gate circuits 32A through 32G and the output latch circuits 36A through 36G constitute in combination the selective transfer circuits of the data signals in accordance with our invention.

Parallel to serial converters 38A, 38B, 38C, 38D, 38E, 38F and 38G are connected between output latch circuits 36A through 36G and output highways 22A through 22G, respectively. These converters translate the incoming parallel data signals into serial format.

Another important component of the switching system 18 is a switching control circuit 40 which controls the various other components of the switching system by switching control signals obtainable from the terminals 12A . . . , 14A . . . , etc. The switching control circuit 40 has the following output lines:

1. A clock line f1 connected to the serial to parallel converters 26A through 26G.

2. A line T8 connected to the input latch circuits 28A through 28G.

3. A write control line $\overline{WE}$ and address specification line AD connected to the data memories 30A through 30G.

4. Lines D1 through D7 connected to the respective gate circuits 32A through 32G.

5. Lines T1 through T7 connected to the respective output latch circuits 36A through 36G.

6. Another clock line, also designated f1 for the same clock pulses conveyed, connected to the parallel to serial converters 38A through 38G.

Figure 3:
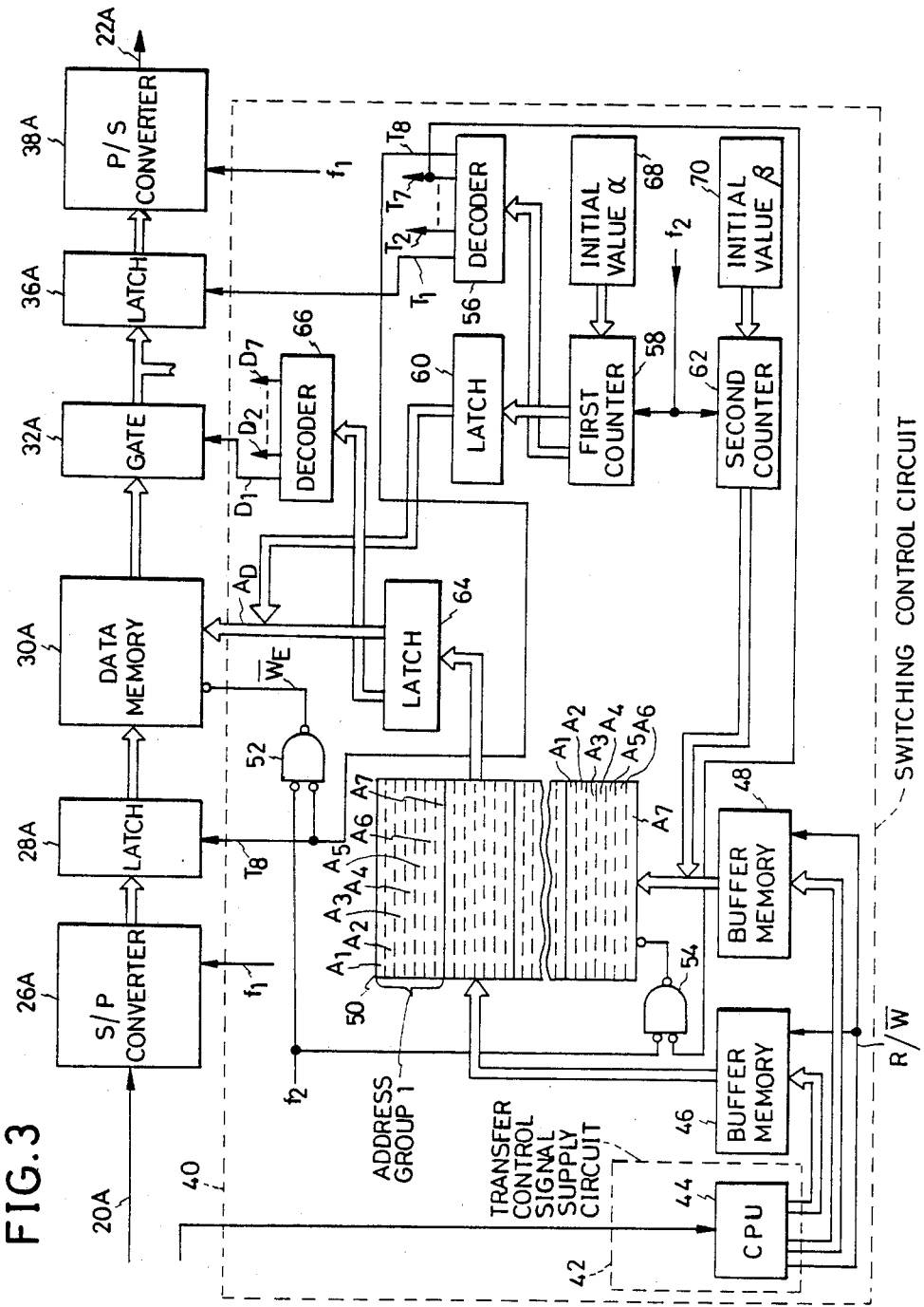
FIG. 3 is a block diagram of a switching control circuit included in the switching system of FIG. 2, shown together with some other representative parts of the switching system for a better understanding of our invention.

FIG. 3 is a more detailed representation of the switching control circuit 40, shown together with the other means of the switching system 18 associated with the first input and output highways 20A and 22A in order to clearly illustrate the constructional and operational relations of the switching control circuit with such representative means. The lines f1 deliver sampling clock pulses to both serial to parallel converters 26A through 26G and parallel to serial converters 38A through 38G. A line f2 connected to the switching control circuit 40 supplies control clock pulses having a cycle T/(n+1)=T/8. The sampling pulses and control pulses are fed from the same clock and hence of the same characteristics in this particular embodiment.

The switching control circuit 40 includes a transfer control signal supply circuit 42 comprising a central processing unit (CPU) 44. The transfer control signal supply circuit 42 inputs the transfer control signals (or switching control signals) which are generated as the terminals 12A . . . , 14A . . . , etc. , are operated. In response to these input signals the CPU 44 puts out, in parallel format, a combination of a first transfer control signal (switching control signal) of three bits indicative of a selected one of the seven input highways 20A through 20G, and a second transfer control signal of five bits indicative of a selected channel of the selected input highway. The CPU 44 further puts out, also in parallel format, a combination of a third transfer control signal of three bits indicative of a selected one of the seven output highways 22A through 22G, and a fourth transfer control signal of five bits indicative of a selected channel of the selected output highway.

The CPU 44 has its outputs connected to both first 46 and second 48 buffer memories. The first buffer memory 46 is for writing the first and second transfer control signals into a control memory 50. The second buffer memory 48, on the other hand, is for delivering the third and fourth transfer control signals to the same control memory 50 as address signals indicative of the memory locations where the associated first and second transfer control signals are to be stored. The CPU 44 is further connected to both buffer memories 46 and 48 by way of a read/write control line R/W.

The control memory 18 has 32 groups of addressed storage locations (or, simply, addresses), from Address Group 1 to Address Group 32, corresponding to the 32 channels of the input highways 20A through 20G and to the 32 addressed storage locations of the data memories 30A through 30G. Each of these 32 address groups comprises seven addresses A1, A2, A3, A4, A5, A6 and A7, corresponding to the seven input highways 20A through 20G and to the seven output highways 22A through 22G. The first and second transfer control signals representative of the calling input highway and input channel are written at the address specified by the the third and fourth transfer control signals representative of the called output highway and output channel. The control memory 18 employed here is a standard semiconductor memory incapable of concurrent writing and reading. This limitation can be overcome by writing the first and second transfer control signals into the control memory 18 in predetermined time relation to the writing of the data signals into the data memories 30A through 30G and by reading the first and second transfer control signals from the control memory in predetermined time relation to the reading of the data signals from the data memories.

Employed for such controlled writing is the control clock pulse line f2 which is connected to one of the two inputs of an OR gate 52 having its output connected to the data memories 30A through 30G and which is further connected to one of the two inputs of another OR gate 54 having its output connected to the control memory 50. The other input of the OR gate 52 is connected to a decoder 56 by way of the line T8 which further is connected to the input latch circuits 28A through 28G as aforesaid. The other input of the OR gate 54 is connected to the same decoder 56 by way of the line T7 which is further connected to the output latch circuit 36G. The OR gate 52 controls the data memories 30A through 30G to determine the periods of writing, permitting such writing when its output is low and inhibiting the writing when its output is high (see FIG. 6D). The other OR gate 54 functions similarly with respect to the control memory 50 (FIG. 6F).

The switching control circuit 40 further includes a first counter 58 which counts the control clock pulses f2 on a numbering system having a radix k(n+1) and which functions as an addressing circuit in the sequential writing of the data signals into the data memories 30A through 30G. The output of the first counter 58 is connected through a latch circuit 60 to the data memories 30A through 30G.

The aforesaid decoder 56 functions not only to control the output latch circuits 36A through 36G but also to control writing into the data memories 30A through 30G and control memory 50. In response to the output from the first counter 58, the decoder 56 puts out a series of negative pulses at every ⅛ moment of each one channel period T from successive ones of is eight output terminals T1 through T8 (FIG. 6H). Thus, being connected to the output T8 of the decoder 56, the OR gate 52 permits writing into the data memories 30A through 30G only during the low periods of the decoder output T8. The OR gate 54, on the other hand, is connected to the output T7 of the decoder 56, thus permitting writing into the control memory 18 only during the low periods of the decoder output T7.

The first and second transfer control signals that have been stored in the control memory 50 are read out sequentially. Employed as an addressing circuit for such sequential readout is a second counter 62 which counts the control clock pulses f2 with a radix k(n+1) and which delivers a readout address signal to the control memory 50. This readout address signal sequentially and repetitively specifies the control memory addresses, in the order from Address 1 of Address Group 1 to Address 7 of Address Group 32.

It is the control memory 50 that specifies the addresses in the data memories 30A through 30G in reading out the data signals therefrom. Thus the control memory 50 has its output coupled to the data memories 30A through 30G via a latch circuit 64. Read out simultaneously from the control memory 50, the first and second transfer control signals are separated from each other by the latch circuit 64, and the second data transfer signal is delivered to the data memories 30A through 30G as a random readout address signal, specifying the readout addresses of the data memories so as to correspond to the selected channels of the input highways.

A decoder 66, an additional component of the switching control circuit 40, is connected between the latch circuit 64 of the switching control circuit and the gate circuits 32A through 32G of the switching system 18. This decoder 66 decodes the three bit first transfer control signals from the latch circuit 64 preparatory to delivery to the gate circuits 32A through 32G from its seven outputs D1 through D7 respectively. Since the first transfer control signal represents the selected one of the seven input highways 20A through 20G, the decoder 66 causes conduction through only that one of the gate circuits 32A through 32G which corresponds to the selected input highway. The gate control signals from the decoder outputs D1 through D7 are synchronized with the readout operation from the control memory 50 and data memories 30A through 30G.

The swithing control circuit 40 further comprises two initial value setting circuits 68 and 70 which are coupled to the first 58 and second 62 counters, respectively, to compensate for the phase or time difference between the same channels of the input highways 20A through 20G and the output highways 22A through 22G. The input highways and output highways are driven in phase in the illustrated embodiment, as will be later described in more detail, so that the initial values α and β for the counters 58 and 62 are so determined by the setting circuits 68 and 70 as to create a difference of 2T+T/8 between the counts of the two counters. This difference is required because of the delay of T due to the serial to parallel converters 26A through 26G and the parallel to serial converters 38A through 38G, and of the delay of T/8 due to the latch circuit 64 of the switching control circuit 40.

The initial values α and β are variable by the setting circuits 68 and 70. Accordingly, these circuits may be utilized for intentionally creating any desired interchannel phase difference between the input and output highways. Let x by the desired interchannel phase difference. Then the initial values α and β may be determined so as to satisfy the equation $$\beta - \alpha = (2+x)T + T/(n+1).$$

Because the phase difference x is zero in the illustrated embodiment, $$\beta - \alpha = 2T + T/(n+1) = 2T + T/8.$$

For the creation of a phase difference of one channel, $$\beta - \alpha - 3T + T/(n+1).$$

Such an interchannel phase difference is required as in cases where additional multiplexers are employed on the output side of the parallel to serial converters 38A through 38G. Delay caused by such multiplexers can be easily compensated for by the intial value setting circuits 68 and 70.

Operation

FIGS. 5(A) and 6(B) indicate that the data signals journey over the input highways 20A through 20G by time division multiplexing on a channel by channel basis. It will also be seen from FIGS. 5(B) and 6(I) that the data signals likewise travel through the output highways 22A through 22G by time division multiplex on a channel by channel basis. The digits 1 through 8 at (B) and (I) in FIG. 6 designate the bits of the data signals. As will be noted from a comparison of (B) and (C) in FIG. 6, the serial to parallel converters 26A through 26G receive each complete channel of data signal in serial format and then put out the same channel of data signal in parallel format; that is, the serial to parallel converters introduce a delay of one channel period T. The parallel data signals are then latched by the latch circuits 28A through 28G.

Figure 4:
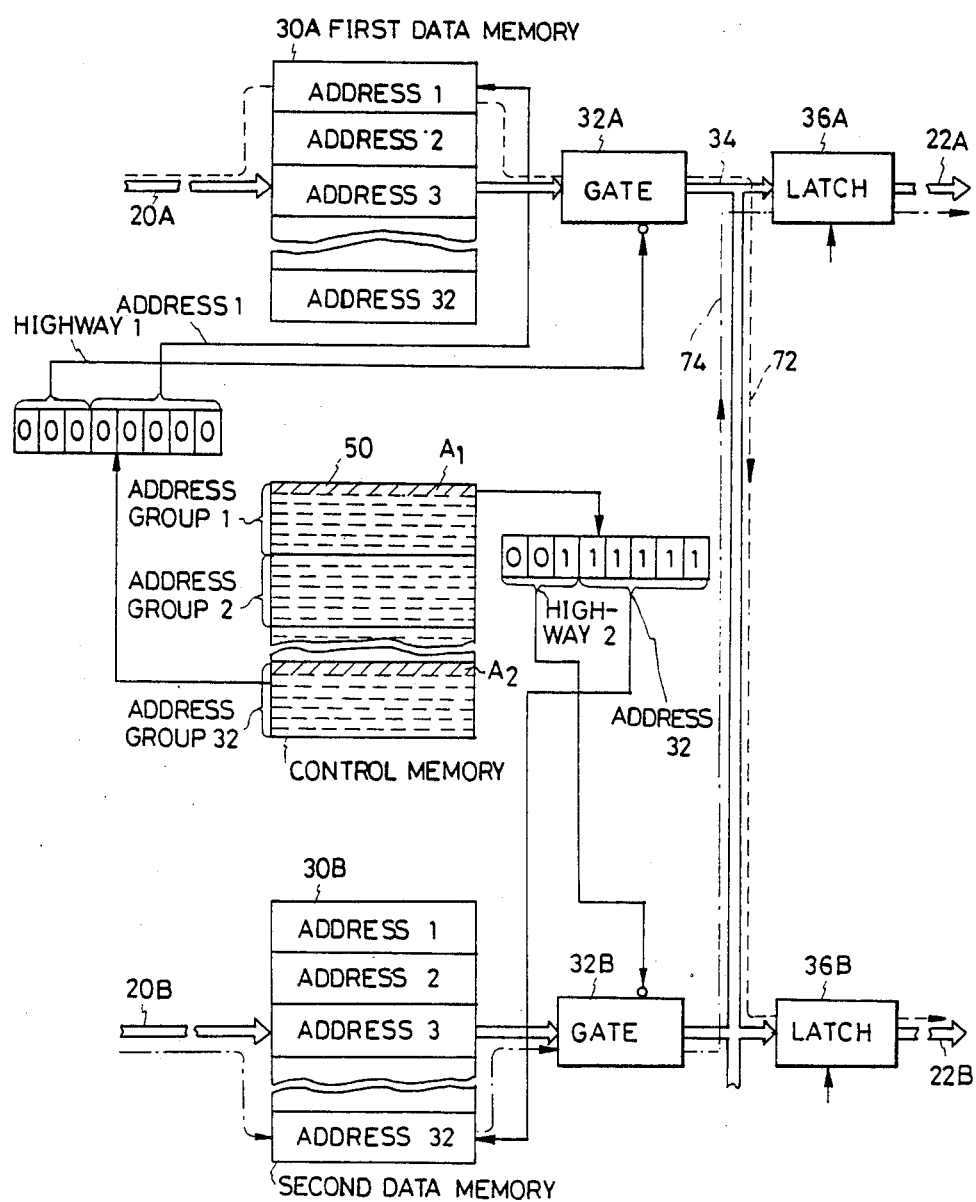
FIG. 4 is a block diagram explanatory of the principles of data transfer by the switching system of FIGS. 2 and 3.

On being latched by the latch circuits 28A through 28G, the data signals are not immediately written into the data memories 30A through 30G but during the periods when the output from the gate circuit 52 of the switching control circuit 40 is low. Such low periods of the gate circuit output are toward the ends of the respective channel periods T. The successive channels of data signal are sequentially written at the corresponding addresses in the data memories 30A through 30G, as illustrated in FIG. 4 which shows only the data memories 30A and 30B by way of example. The data signal of Channel 1 is written at Address 1, the data signal of Cahnnel 2 at Address 2, and so forth, until the data signal of Channel 32 is written at Address 32. Then the same writing cycle is repeated.

In writing the data signals as above, the data memories 30A through 30G are adressed by the output from the first counter 58 of the switching control circuit 40. As will be understood from a comparison of (B) and (C) in FIG. 6, the data signals of Channel 30, for instance, are written into the data memories 30A through 30G while those of Channel 31 are being transferred over the input highways 20A through 20G. The first counter 58 must therefore address the data memories in a channel phase different from that of the input highways. The required phase difference is provided by the initial value setting circuit 68.

Written sequentially into the data memories 30A through 30G as above, the data signals are then randomly read out as the control memory 50 specifies such readout addresses in the data memories.

We will now describe the operation of the telecommunications network 10, and particularly of its time division switching system 18, in the case of an exchange of messages between Channel 1 on the first input highway 20A and Channel 32 of the second output highway 22B. For such operational description, we have illustraed in FIG. 4 the control memory 50 in conjunction with only two data memories 30A and 30B, two gate circuits 32A and 32B, and two output latch circuits 36A and 36B which are all associated with the first input and output highways 20A and 22A in question. The CPU 44, FIG. 3, of the switching control circuit 40 generates the required control signals in response to a call signal from the terminal 12A, corresponding to Channel 1 of the first input highway 20A, to the terminal, not shown, corresponding to Channel 32 of the second output highway 22B. The output signals of the CPU 44 in this instance are:

1. The first transfer control signal of three bits (e.g. "000") representative of the first input highway 20A.
2. The second transfer control signal of five bits (e.g. "00000") representative of Channel 1 of the first input highway 20A.
3. The third transfer control signal of three bits (e.g. "001") representative of the second output highway 22B.
4. The fourth transfer control signal of five bits (e.g. "11111") representative of Channel 32 of the second output highway 22B.

The first and second transfer control signals are written at that address in the control memory 50 which is determined by the third and fourth transfer control signals. The control memory address where the first and second transfer controll signals ("00000000") are written is, in this case, Address A2 of Address Group 32, as indicated in FIG. 4. This introduction of the first and second transfer control signals into the control memory 50 would suffice in the case of a one way communication. For two way communications, however, as in the case of a telephone conversation, a message must also be sent from Channel 32 of the second input highway 20B to Channel 1 of the first output highway 22A. This requires the registration of the "return address" in the control memory 50.

Accordingly, the third and fourth transfer control signals ("00111111") are further written into the control memory 50 at the address (Address A1 of Address Group 1) determined by the first and second transfer control signals ("00000000"). It will be seen that, in this registration of the "return address", the data "001" indicative of the second input highway 20B are used as the first transfer control signal, and the data "11111" indicative of Channel 32 as the second transfer control signal, which signals are both written in the control memory 50. The data "000" indicative of the first output highway 22A are used as the third control signal, and the data "00000" indicative of Channel 1 as the fourth control signals, which signals serve to determine the control memory address (Address A1 of Address Group 1) where the data "00111111" are to be written.

The control memory 50 is read sequentially by the second counter 62, with its Address Groups 1 through 32 specified one channel in advance of the channel phase on the input highways 20A through 20G and output highways 22A through 22G, as indicated in FIGS. 5(C) and 6(G). This is to compensate for the one channel delay to be caused by the parallel to serial converters 38A through 38G. FIG. 6(G) shows how the control memory 50 is addressed for readout. The different data that have been stored in Addresses A1 through A7 of each address group are read out sequentially; that is, the control memory 50 is addressed seven (n) times during each channel period T.

Figure 5:
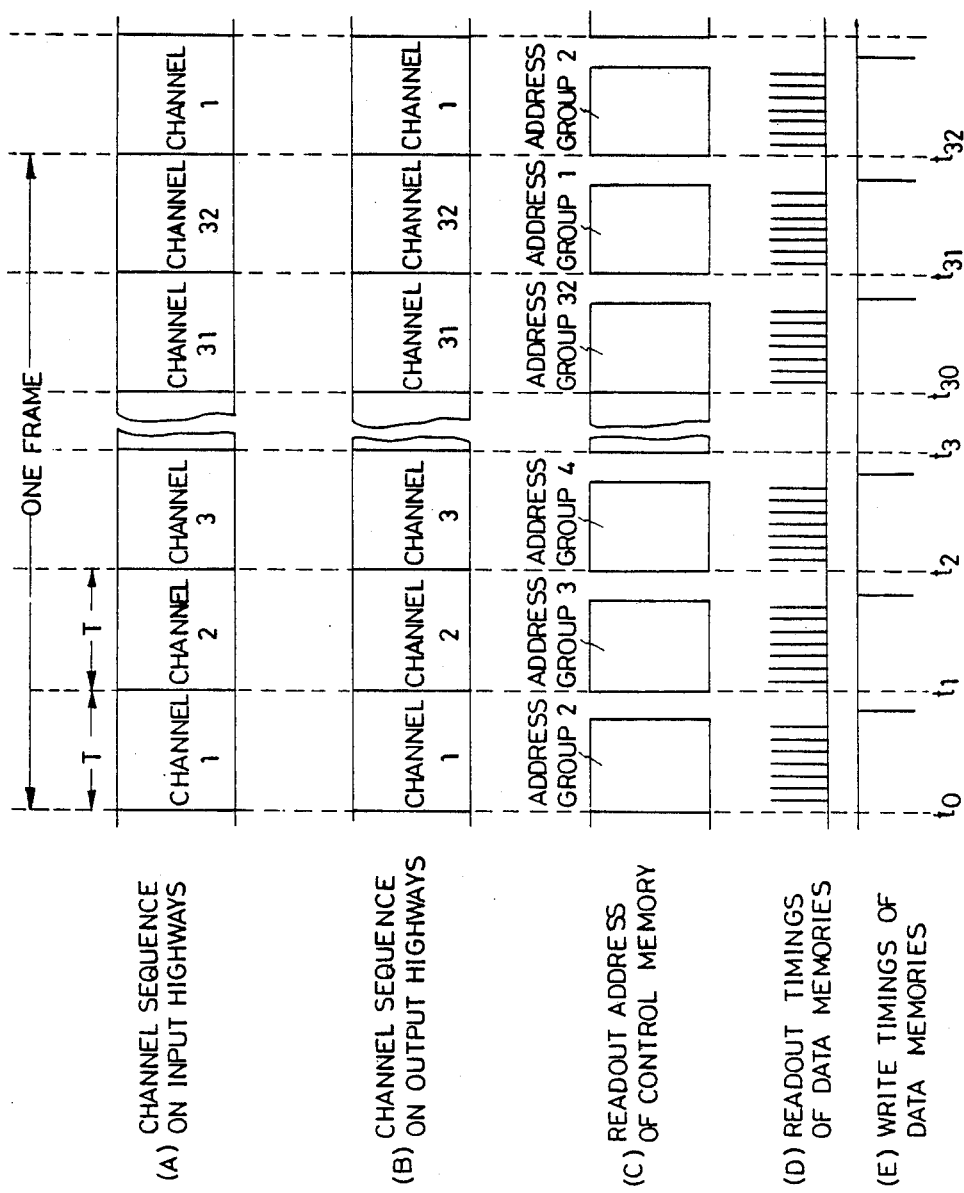
FIG. 5 is a chart explanatory of the operation of the various parts of the switching system of FIGS. 2 and 3.

When Address A2 of Address Group 32 is specified during the channel period from moment t30 to moment t31 in FIGS. 5 and 6, the data "00000000" are read out therefrom as in FIG. 4. The last five bits (second transfer control signal) "00000" of the recovered data specify Address 1 of the first data memory 30A, and the required data signal is read out from that address. Although the other data memories 30B through 30G are then likewise addressed, the corresponding outputs therefrom are blocked by the subsequently connected gate circuits 32B through 32G as the latter are then held nonconductive.

On the other hand, the first three bits (first transfer control signal) "000" of the data read out from Address A2 of Address Group 32 are decoded by the decoder 66, FIG. 3, of the switching control circuit 40. The decoder 66 delivers the corresponding control signal from its output D1 to the first gate circuit 32A associated with the first input highway 20A, thereby causing conduction therethrough. Thus the first gate circuit 32A passes the data signal that has been read out as above from Address 1 of the first data memory 30A, on to the common transmission path 34 between all the gate circuits 32A through 32G and all the output latch circuits 36A through 36G. The second output latch circuit 36B is activated by the trailing edge of each incoming negative pulse from the output terminal T2 of the decoder 56, FIG. 3, of the switching control circuit 40, shown in FIG. 6(H), which is synchronized with the readout of Address A2 of each address group of the control memory 18, as will be seen from FIG. 6(G). Accordingly, the second output latch circuit 36B latches the data signal that has been read from Address 1 of the first data memory 30A in response to the reading of Address A2 of Address Group 32 of the control memory 50 as in FIG. 4. The second latch circuit 36A delivers the data signal to the second parallel to serial converter 38B.

The readout of the Channel 1 data signal from Address 1 of the first data memory 30A takes place during the transfer of the Channel 31 data signals on the output highways 22A through 22G, as shown in FIGS. 5(B) and 6(I). However, being delayed by one channel period T for conversion into serial format by the second parallel to serial converter 38B, the Channel 1 data signal is transferred over the second output highway 22B during the Channel 32 period (from t31 to t32). Essentially, therefore, a communication path has thus been established as indicated by the dashed line designated 72 in FIG. 4.

The transfer control signal "00111111" that above been stored at Address A1 of Address Group 1 of the control memory 50, on the other hand, is read out as this address is specified during the period from moment t31 to moment t32 as in FIG. 6(G). As indicated in FIG. 4, the last five bits "11111" of the recovered data represent Address 32 of the second data memory 30B, whereas the first three bits "001" are decoded by the decoder 66, which then causes conduction through the second gate circuit 32B. Thus the data signal that has been read out from Address 32 of the second data memory 30B during the period from moment t31 to moment t32 is latched by the first output latch circuit 36A as the decoder 22 delivers thereto a negative pulse from its output T1 during the period from moment t31 to moment t32 in FIG. 6(H), then translated into serial format by the parallel to serial converter 38A, and then sent out to the first output highway 22A during its Channel 1 period (following the moment t32. We have indicated by the dot and dash line designated 74 in FIG. 4 the path of the Channel 32 data signal from the second input highway 20B to the first output highway 22A during the Channel 1 period of the latter.

As will be seen by referring back to FIG. 1, Channel 1 of the first input highway 20A and Channel 1 of the first output highway 22A share the terminal 12A. Channel 32 of the second input highway 20B and Channel 32 of the second output highway 22B also chare a terminal that is not shown. Therefore, two way communications between the two terminals are possible through the switching system 18 of the foregoing construction and operation. It is self evident that such communications are possible between any other two terminals of the telecommuncations system 10. The switching system 18 further allows, of course, one way communication from any one terminal to another.

Although we have shown and described our invention in terms of but one embodiment thereof, we recognize that our invention admits of a variety of modifications, alterations or adaptations within the broad teaching hereof. For example:

1. The invention may be adapted for switching between transit highways.
2. The control memory 50 of the switching control circuit 40 could be divided into a memory for the storage of highway data and another for the storage of channel data.
3. The terminals 12A . . . , 14A . . . , etc. , could be of the type capable of transmitting digitally coded signals.
4. The number of output highways could be less than that of input highways.

We claim:

1. In a telecommunications network having n input highways, whre n is an integer of not less than two, each for the time division multiplex transmission of k channels of data, where k is an integer of not less than two, and m output highways, where m is an integer equal to or less than n, each for the time division multiplex transmission of k channels of data, each channel of data on the input and output highways having a preassigned transmission period (T), a time division multiplex data transfer system for the transfer of data from any selected channel of any selected input highway to any desired channel of any desired output highway, comprising:

(a) memory means comprising n data memories corresponding respectively to the input highways and each having k addresses corresponding respectively to the channels of the corresponding one of the input highways, the address of each data memory being adapted to sequentially store the corresponding channels of data from the corresponding one of the input highways, the stored data being read out from each data memory n times during each preassigned channel transission period (T) on the input and output highways, all the data memories being addressed in common for such readout; and (b) selective data transfer means for transferring to the desired channel of the desired output highway the data that has been read out from that one of the addresses which corresponds to the selected input channel, of that one of the data memories which corresponds to the selected input highways.

2. In a telecommunications network having an n input highways, where n is an integer of not les than two, each for the time division multiplex transmission of k channels of data, where k is an integer of not less than two, and m output highways, where m is an integer equal to or less than n, each for the time division multiplex transmission of k channels of data, each channel of data on the input and output highways having a preassigned transmission period (T), a time division multiplex data transfer system for the transfer of data from any selected channel of any selected input highway to any desired channel of any desired output highway, comprising:

(a) n data memories corresponding rspectively to the input highways and each having k addresses corresponding respectively to the channels of the corresponding one of the input highways for storing the corresponding channels of data from the corresponding one of the input highways;

(b) selective data transfer means for transferring to the desired channel of the desired output highway the data that has been read out from that one of the addresses which corresponds to the selected input channel, of that one of the data memories which corresponds to the selected input highway; and (c) control circuit means coupled to the data memories for causing the addresses of each data memory to sequentially store the corresponding channels of data from the corresponding one of the input highways, and for reading out the stored data from each data memory n times during each preassigned channel transmission period (T) on the input and output highways;

(d) the control circuit means including transfer control signal supply means for supplying a first transfer control signal indicative of the selected input highway, a second transfer control signal indicative of the selected channel of the selected input highway, a third transfer control signal indicative of the selected output highway, and a fourth transfer control signal indicative of the selected channel of the selected output highway, the control circuit means using the first to fourth transfer control signals for reading out the stored data from that data memory address which corresponds to the selected input channel, and for delivering the recovered data of the selected channel of the selected input highway to the selected channel of the selected output highway.

3. In a telecommunications network having n input highways, where n is an integer of not less than two, each for the time division multiplex transmission of k channels of data in serial format, where k is an integer of not less than two, and m output highways, where m is an integer equal to or less than n, each for the time division multiplex transmission of k channels of data in serial format, a time division multiplex data transfer system for the transfer of data from any selected channel of any selected input highway to any desired channel of any desired output highway, comprising:

(a) n serial to parallel converters to be connected one to each input highway for converting the data from serial to parallel format;

(b) n input latch circuit connected one to each serial to parallel converter for latching the data of parallel format from the associated serial to parallel converter;

(c) n data memories connected one to each input latch circuit and each having k addresses for storing respectively the k channels of data from the corresponding input latch circuit;

(d) n gate circuits connected one to each data memory for permitting the selective passage therethrough of the data of parallel format from the corresponding data memory, all the gate circuits having outputs interconnected;

(e) m output latch circuits corresponding respectively to the output highways and connected to the interconnected outputs of the gate circuits;

(f) m parallel to serial converters connected one between each output latch circuit and each output highway for reconverting the data from parallel to serial format;

(g) first addressing means for sequentially storing the k channels of data of parallel format from each input highway at the respective addresses of the corresponding data memory;

(h) a control memory for addressing the data memories in reading out the data therefrom and for controlling the gate circuits so as to cause selective passage therethrough of the data read out from the respectively data memories, the control memory having k address groups corresponding respectively to the channels on each input highway and output highway, each address group having n addresses corresponding respectively to the input highways;

(i) write control circuit means including transfer control signal supply means for supplying a first transfer control signal of parallel format indicative of the selected input highway, a second transfer control signal of parallel format indicative of the selected channel of the selected input highway, a third transfer control signal of parallel format indicative of the selected output highway, and a fourth transfer control signal of parallel format indicative of the selected channel of the selected output highway, the write control circuit means being adapted to store the first and second transfer control signals at the address corresponding to the selected output highway, of that address group of the control memory which corresponds to the selected output channel, by using the third and fourth transfer control signals to determine the control memory address where the first and second transfer control signals are to be stored;

(j) second addressing means for sequentially addressing the control memory for reading out the transfer control signals therefrom with a predetermined time relationship between the reading of the k address groups of the control memory and the transmission of the k channels of data on the input and output highways;

(k) third addressing means responsive to the second transfer control signal read out from the control memory for reading out the data from that address of each data memory which corresponds to the selected input channel;

(l) gate control means responsive to the first transfer control signal read out from the control memory for causing conduction through that one of the gate circuits which corresponds to the selected input highway; and (m) latch control means for causing the data latching operation of that one of the output latch circuits which corresponds to the selected output highway, in synchronism with the readout of the transfer control signals from that address of the control memory which corresponds to the selected output channel of the selected output highway.

4. The invention of claim 3 wherein the first addressing means comprises:

(a) a first counter for sequentially addressing the data memories by counting clock pulses of a predetermined recurrence rate; and (b) a first initial value setting circuit for variably setting the initial value of the first counter; and wherein the second addressing means comprises:

(c) a second counter for sequentially addressing the control memory by counting the clock pulses of the predetermined recurrence rate; and (d) a second initial value setting circuit for variably setting the initial value of the second counter.

5. In a telecommunications network having first and second input highways having first and second coded names assigned respctively thereto, each of the first and second input highways being for the time division multiplex transmission of k channels of data in serial format, where k is an integer of not less than two, and first and second output highways also having the first and second coded names assigned respectively thereto, each of the first and second output highways being for the time division multiplex transmission of k channels of data in serial format, a time division multiplex data transfer system capable of two way transfer of data as from any selected channel, having a third coded name assigned thereto, of the first input highway to any selected channel, having a fourth coded name assigned thereto, of the second output highway, and from the selected channel, having the fourth coded name assigned thereto, of the second input highway to the selected channel, having the third coded name assigned thereto, of the first output highway, comprising:

(a) first and second serial to parallel converters to be connected respectively to the first and second input highways for converting the data from serial to parallel format;

(b) first and second input latch circuit connected respectively to the first and second serial to parallel converter for latching the data of parallel format from the respective serial to parallel converter;

(c) first and second data memories connected respectively to the first and second input latch circuits and each having k addresses for storing respectively the k channels of data from the corresponding input latch circuit;

(d) first and second gate circuits connected respectively to the first and second data memories for permitting the selective passage therethrough of the data of parallel format from the corresponding data memory, all the gate circuits having outputs interconnected;

(e) first and second ouput latch circuits corresponding respectively to the first and second output highways and connected to the interconnected outputs of the gate circuits;

(f) first and second parallel to serial converters connected respectively between the first and second output latch circuits and the first and second output highways for reconverting the data from parallel to serial format;

(g) first addressing means for sequentially storing the k channels of data of parallel format from each input highway at the respective addresses of the corresponding data memory;

(h) a control memory for addressing the first and second data memories in reading out the data therefrom and for controlling the first and second gate circuits so as to cause selective passage therethrough of the data read out from the respective data memories, the control memory having k address groups corresponding respectively to the k channels on each input highway and output highway, each address group having first and second addresses corresponding respectively to the first and second input highways;

(i) write control circuit means for storing the first and third coded names at that address of the control memory which is determined by the second and fourth coded names at that address of the control memory which is determined by the first and third coded names;

(j) second addressing means for sequentially addressing the control memory for reading out the coded names therefrom with a predetermined time relationship between the reading of the k address groups of the control memory and the transmission of the k channels of data on the input and output highways;

(k) third addressing means responsive to the third coded name read out from the control memory for reading out the data from that address of the first data memory which corresponds to the third coded name;

(l) fourth addressing means responsive to the fourth coded name read out from the control memory for reading out the data from that address of the second data memory which corresponds to the fourth coded names;

(m) gate control means responsive to the first coded name read out from the control memory for causing conductive through the first gate circuit, and to the third coded name read out from the control memory for causing conduction through the second gate circuit; and (n) latch control means for causing the second output latch circuit to latch the output from the first gate circuit upon conduction thereof, and for causing the first output latch circuit to latch the output from the second gate circuit upon conduction thereof.

6. In a telecommunications network having n input highways, where n is an integer of not less than two, each for the time division multiplex transmission of k channels of data in serial format, where k is an integer of not less than two, and m output highways, where m is an integer equal to or less than n, each for the time division multiplex transmission of k channesl of data in serial format, each channel of data on the input and output highways having a preassigned transmission period (T), a method of transferring data from any selected channel of any selected input highway to any desired channel of any desired output highway, comprising:

(a) converting the data from each input highway from serial to parallel format;

(b) latching the data of parallel format from each input highway;

(c) sequentially writing the latched data from the input highways into respective data memories each having k addresses for storing respectively the k channels of data from the corresponding one of the input highways, the data being so written during a predetermined part of the transmission period (T) of each channel of data on the input and output highways;

(d) reading out the data from the data memories n times during all but the predetermined part of the transmission period (T) of each channel of data on the input and output highways, all the data memories being addressed in common for such readout;

(e) gating the data read out from the all data memories to choose only the data of the selected channel of the selected input highway;

(f) latching the chosen data by that one of m latch circuits, corresponding respectively to the m output highways, which corresponds to the selected output highway;

(g) reconverting the latched data from parallel to serial format; and (h) delivering the data of serial format to the selected output highway.

* * * * *

UNITED STATES PATENT AND TRADEMARK OFFICE
CERTIFICATE OF CORRECTION

PATENT NO. : 4,658,397
DATED : April 14, 1987
INVENTOR(S) : Kawamura et al

It is certified that error appears in the above-identified patent and that said Letters Patent is hereby corrected as shown below:

Column 8, line 23, delete "swithing" and insert -- switching --.

Column 8, line 63, delete "intial" and insert -- initial --.

Column 9, line 27, delete "Cahnnel" and insert -- Channel --.

Column 9, lines 51-52, delete "illustraed" and insert -- illustrated --.

Column 12, line 18, delete "whre" and insert -- where --.

Column 12, line 40, delete "transission" and insert -- transmission --.

Column 12, line 51, delete "les" and insert -- less --.

Signed and Sealed this

Second Day of February, 1988

Attest:

DONALD J. QUIGG

Attesting Officer

Commissioner of Patents and Trademarks